United States Patent
Thomson et al.

(10) Patent No.: US 6,827,517 B2
(45) Date of Patent: Dec. 7, 2004

(54) REPLACEABLE BREAKAWAY LINK FOR COATING HEAD ASSEMBLY

(75) Inventors: Roderick K. Thomson, Rochester, NY (US); Robert D. Rotolo, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/375,322

(22) Filed: Feb. 26, 2003

(65) Prior Publication Data

US 2003/0161678 A1 Aug. 28, 2003

Related U.S. Application Data

(62) Division of application No. 09/923,114, filed on Aug. 6, 2001, now abandoned.

(51) Int. Cl.[7] ................................................ F16P 5/00
(52) U.S. Cl. ........................................... 403/2; 403/404
(58) Field of Search ............................ 403/2, 187, 188, 403/230, 293, 345; 118/256, 263, 265

(56) References Cited

U.S. PATENT DOCUMENTS

| | | | |
|---|---|---|---|
| 3,961,642 A | * | 6/1976 | Thomas et al. ............. 403/2 X |
| 4,071,970 A | * | 2/1978 | Strizki ....................... 403/2 X |
| 4,236,843 A | * | 12/1980 | Chisholm ...................... 403/2 |
| 4,490,062 A | * | 12/1984 | Chisholm ...................... 403/2 |
| 4,868,600 A | | 9/1989 | Hays et al. |
| 5,049,444 A | | 9/1991 | Bingham et al. |
| 5,172,170 A | | 12/1992 | Hays et al. |
| 5,217,837 A | | 6/1993 | Henry et al. |
| 5,219,612 A | | 6/1993 | Bingham et al. |
| 5,380,040 A | * | 1/1995 | Perichon et al. ............. 403/2 X |
| 5,484,217 A | * | 1/1996 | Carroll et al. .................. 403/2 |
| 5,871,832 A | | 2/1999 | Finn et al. |
| 5,884,432 A | * | 3/1999 | DeLillo |
| 5,945,223 A | | 8/1999 | Kuntz et al. |
| 6,068,201 A | * | 5/2000 | Hawley et al. |
| 6,159,291 A | * | 12/2000 | Morita et al. |
| 6,257,435 B1 | * | 7/2001 | Chedister et al. |
| 6,274,822 B1 | * | 8/2001 | Light et al. |

* cited by examiner

Primary Examiner—Daniel P. Stodola
Assistant Examiner—Ryan M. Flandro
(74) Attorney, Agent, or Firm—Joseph M. Young

(57) ABSTRACT

A coating head assembly incorporating a replaceable breakaway link. The breakaway link connects two portions of the coating head assembly and has a sharp bend defining a weakened portion. In the event of a collision, the breakaway link will break to reduce the likelihood of breakage of any other part of the coating head assembly. Repair then only requires that the link be replaced, rather than the coating head assembly to be rebuilt. This invention reduces the coating head repair time from a fifteen-hour job of rebuilding the coating head assembly to a three-hour job of tooling a new link.

9 Claims, 6 Drawing Sheets

REPLACEABLE BREAKAWAY LINK FOR COATING HEAD ASSEMBLY

CROSS-REFERENCE TO RELATED APPLICATIONS

This is a divisional of application Ser. No. 09/923,114, filed Aug. 6, 2001 now abandoned.

FIELD OF THE INVENTION

The present invention relates generally to a flow coating apparatus, and more specifically to a method and apparatus such as one including a breakaway link for a coating head assembly.

BACKGROUND OF THE INVENTION

The apparatus and process of the present invention are useful in the printing arts and, more particularly, in the known process of electrophotographic printing.

An electrophotographic printing apparatus can include a charge retentive surface, typically known as a photoreceptor, which is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. Contacting the latent image with a finely divided electrostatically attractable powder known as "toner" develops the latent image. Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto by fusing the toner image to the paper to form a permanent record of the image to be reproduced. Subsequent to development, excess toner left on the charge retentive surface is cleaned from the surface. This process is useful for light lens copying from an original or printing electronically generated or stored originals such as with a raster output scanner (ROS), where a charged surface may-be imagewise discharged in a variety of ways.

Several components in the electrophotographic printing process described above are in the form of polymeric rolls and belts. Fusing rolls, which are used to fix the toner image on a substrate, represent a component that is typically in the form of polymeric rolls and belts. Also included among these components are bias charge rolls (BCRs) and bias transfer rolls (BTRs) that electrostatically charge the photoreceptor. Other forms of polymeric rolls and belts include the pressure or backup roll used with a fusing roll to fix the toner image on a substrate. Another form of a polymeric rolls and belts are donor rolls which transfer oil to the fuser roll that assists in releasing the toner from the fuser roll. A further form of polymeric rolls and belts include intermediate transfer rolls and belts that transfer developed images. Another form of polymeric rolls and belts include photoconductive belts and rolls. Other forms of polymeric rolls and belts include those belts and rolls used in Hybrid Scavangeless Development (HSD) as disclosed in U.S. Pat. No. 4,868,600 to Hays et al. and in U.S. Pat. No. 5,172,170 to Hays et al., the relevant portions thereof incorporated herein by reference. All of these polymeric rolls and belts are typically manufactured by spraying or by dipping Fuser rolls and belts are examples of polymeric rolls and belts that are particularly difficult to manufacture. The elevated temperatures and pressures of these rolls and the accurate size and finish requirements necessary to insure proper copy quality make their manufacture difficult.

The fusing of the toner image to the paper to form a permanent record of the image is an important part of the xerographic process. Fusing of the toner image is typically done by heat fixation. The heat fixation may be in the form of radiation, conduction, convection, or induction. Most modern xerographic processes adhere the image to the paper by conduction heating the toner image, which is performed by a fusing roll in contact with the toner image. A fusing roll is placed in rolling contact with a backup roll forming a nip therebetween. The paper having the toner image lying thereon is fed between the rolls through the nip. Heat from the fusing roll together with the pressure within the nip between the fuser roll and the backup roll serve to fuse the image to the paper. Heat is typically applied internally within the roll and is transferred through the substrate of the roll onto the periphery of the roll and onto the paper. The rolls typically include a thermally conductive substrate with a surface layer that is also thermally conductive. To assure uniform transfer of the image onto the paper, typically the fuser roll coating is conformable to the paper. For example, the coating may be in the form of a rubber or polymer material, e.g., a fluoroelastomer coating.

Applying fluoroelastomer and other rubber type coatings to fuser roll substrates is fraught with many problems. The coating can be applied to the substrate by a few typical methods. These include dipping of the substrate into a bath of coating solution or spraying the periphery of the substrate with the coating material.

Spraying is a typical method for the manufacture of fluoroelastomer rollers. The spraying process is very slow and costly. Also, the spraying process requires having the coating solution in a form that is very volatile including many volatile organic chemicals. Further, the spraying process is very prone to air pockets or pits forming in the coating. These pits or air pockets in the coating material of the roll result in improper fusing and poor image quality. Because of the nature of the spray process, much of the coating material is lost to the atmosphere requiring an excess amount of the coating material, which can sometimes be costly. Also, the loss of the volatile chemicals can result in expensive containment costs for systems to contain the volatile chemicals as well as increased disposal costs of these materials.

Another typical method for manufacturing fluoroelastomer rollers is to drip material over a horizontally rotating cylinder. With this process a portion of the material adheres to the cylinder and the remainder drips from the cylinder. The amount of material added to the roll is not precisely controlled as the percentage that adheres varies as parameters change over the production run. Also the material forms a wavy surface where the material is poured.

U.S. Pat. No. 5,871,832 discloses a method of coating a substrate, wherein the coating is applied to the substrate by rotating the substrate about its longitudinal axis and applying the coating from an applicator to the substrate in a spiral pattern in a controlled amount so that substantially all the coating that exits the applicator adheres to the substrate. U.S. Pat. No. 5,871,832 is hereby incorporated herein in its entirety.

U.S. Pat. No. 5,871,832 discloses a flow coating process for coating a fuser roll. The method includes first providing a generally cylindrically shaped substrate. The substrate is rotated about a longitudinal axis of the substrate. A fluid coating is applied to the periphery of the substrate in a spiral pattern using a guide to direct the coating onto the periphery of the substrate. After the coating is fully applied, the coating is ground to a precision tolerance. To obtain optimum surface configuration, subsequent operations such as superfinishing or polishing the outer periphery may also be required. This flow coating process is appropriate for generating multi layered printer rolls or belts, for example fuser rolls, e.g., the multi layered fuser roll of U.S. Pat. No. 5,217,837 to Henry et al, the relative portions thereof incorporated herein by reference. The surface condition and the geometry and size of the substrate may require accurate tolerances. Further, the substrate may need preparation to obtain a surface to which the fluid coating may adequately adhere. In embodiments, rolls were constructed using an adhesive coating applied to the substrate. The adhesive coating may be any suitable material, e.g., silane. U.S. Pat. No. 5,219,612 to Bingham and U.S. Pat. No. 5,049,444 to Bingham disclose a specific adhesive layer, the disclosure of which are totally incorporated herein by reference.

A coated fuser roll may be generated that includes coated layers of different materials. For example, a multi layered fuser roll may be used from this process such as a fuser roll described in U.S. Pat. No. 5,217,837 to Henry et al. Such a roll includes a top coating fabricated from a material to obtain optimum release of toner from the roll and a base coat fabricated from a material to obtain optimum thermal transfer. The coating may be applied in a solution with coating additives. Such a solution with approximately 28 percent solids has been found to be effective. The coating may be applied at any satisfactory rate. A rate of 0.002 inches per pass was found to be effective.

In practice, embodiments of this method currently use a coating head assembly that is designed to break in the event of a collision with a roll on the coating conveyor. With the current design, a broken coating head assembly is replaced and rebuilt. Rebuilding the current coating head assembly requires 15 hours per collision.

SUMMARY OF EMBODIMENTS OF THE INVENTION

In accordance with embodiments, a flow coating apparatus has a coating head assembly that incorporates a replaceable breakaway link into the coating head. In the event of a collision, this link will break rather than any other part of the coating head. Repair then only requires the link to be replaced, rather than having to rebuild the coating head assembly. This invention, in embodiments, can reduce coating head repair time from approximately fifteen-hours to rebuild the coating head assembly to approximately three-hours to tool a new link.

BRIEF DESCRIPTION OF THE DRAWINGS

The invention will be described in detail herein with reference to the following figures in which like reference numerals denote like elements and wherein.

Figure 1:
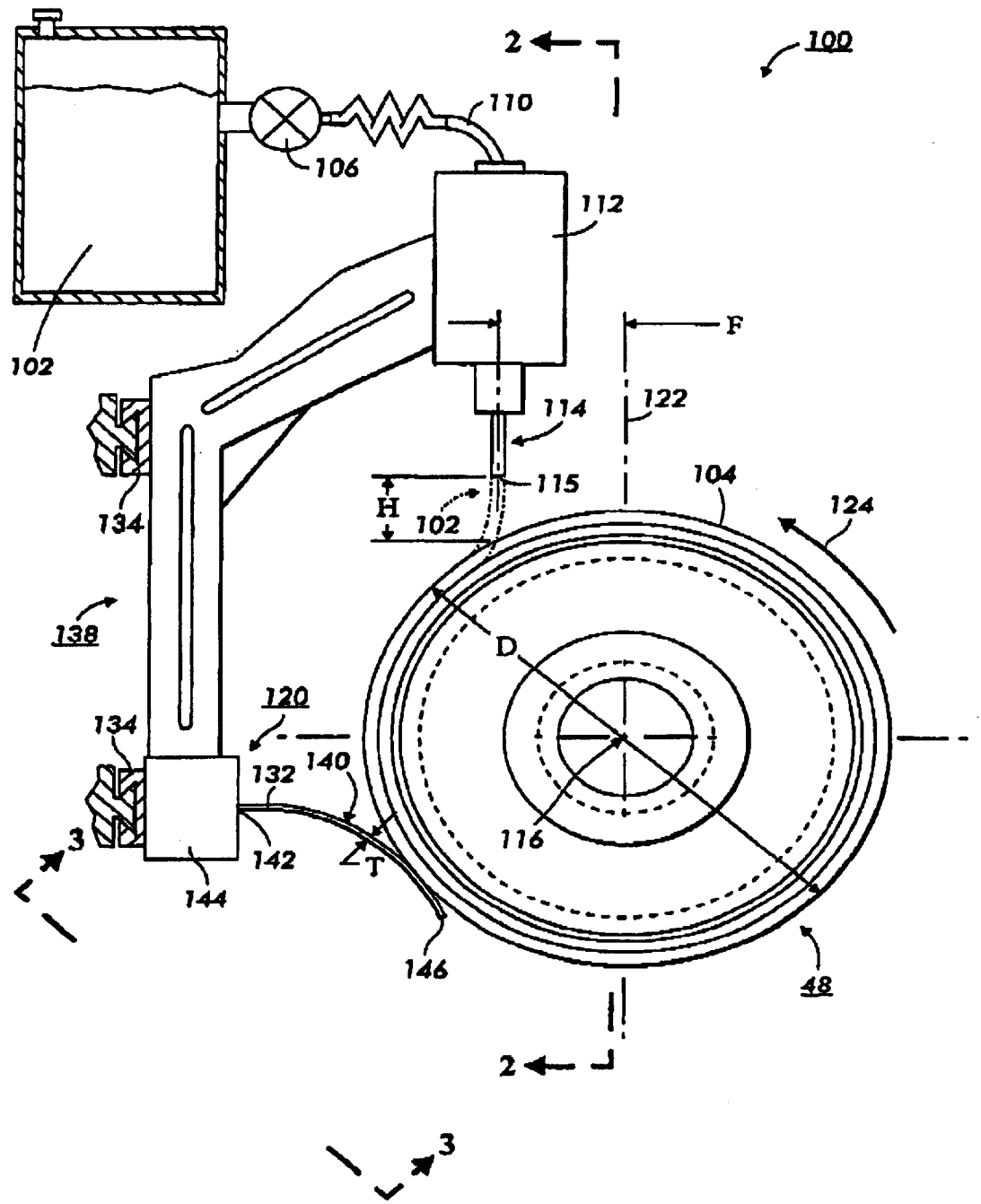
FIG. 1 is a schematic end view of a flow coated fuser roll being prepared on a turning apparatus according to the present invention.

While the present invention will be described in connection with exemplary embodiments thereof, it will be understood that the description of the exemplary embodiments are not intended to limit the invention to those embodiments. On the contrary, the following description is intended to encompass all alternatives, modifications, and equivalents as may be included within the spirit and scope of the invention as illustrated by the appended claims.

DETAILED DESCRIPTION OF EMBODIMENTS OF THE INVENTION

For a general understanding of the features of the present invention, reference is made to the drawings. In the drawings, like reference numerals have been used throughout to identify substantially identical elements.

In embodiments disclosed, the method and apparatus of the present invention can be used to create polymeric printing members for electrophotographic printing machines. U.S. Pat. No. 5,871,832 discloses a description of an example of such a printing machine. The machine disclosed therein is only meant to be an example and is not intended to limit the scope of the present invention. The breakaway link described in detail below can be used in a wide array of machines that are subject to collisions. The link enables a user to control where a break will occur in an apparatus.

In embodiments of the invention discussed herein primarily relate to use with a flow coating apparatus for creating rolls, the method and apparatus of flow coating rolls is described below.

Figure 2:
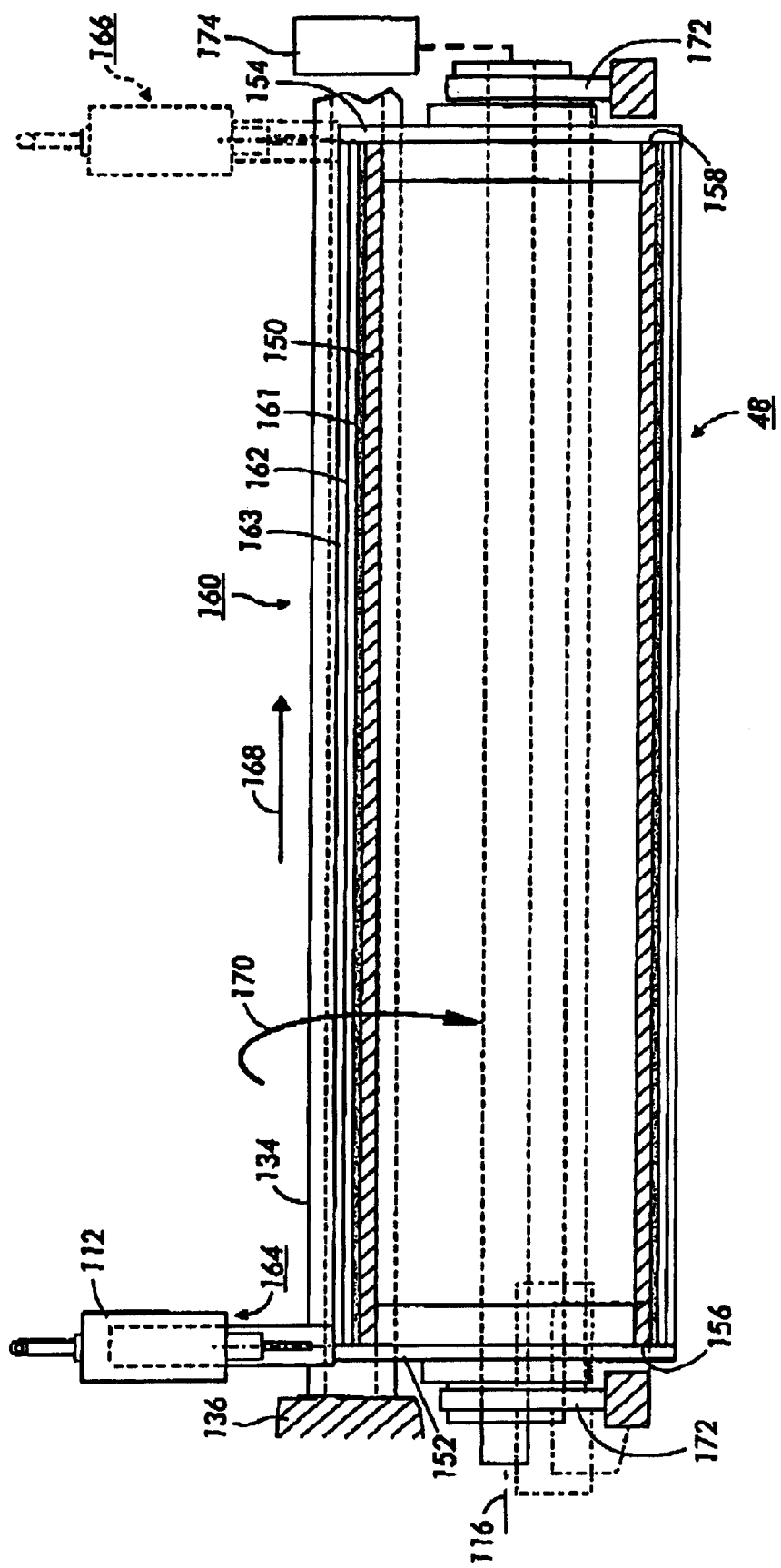
FIG. 2 is a schematic sectional view along the line 2—2 in the direction of the arrows of the FIG. 1 fuser roll.
Figure 3:
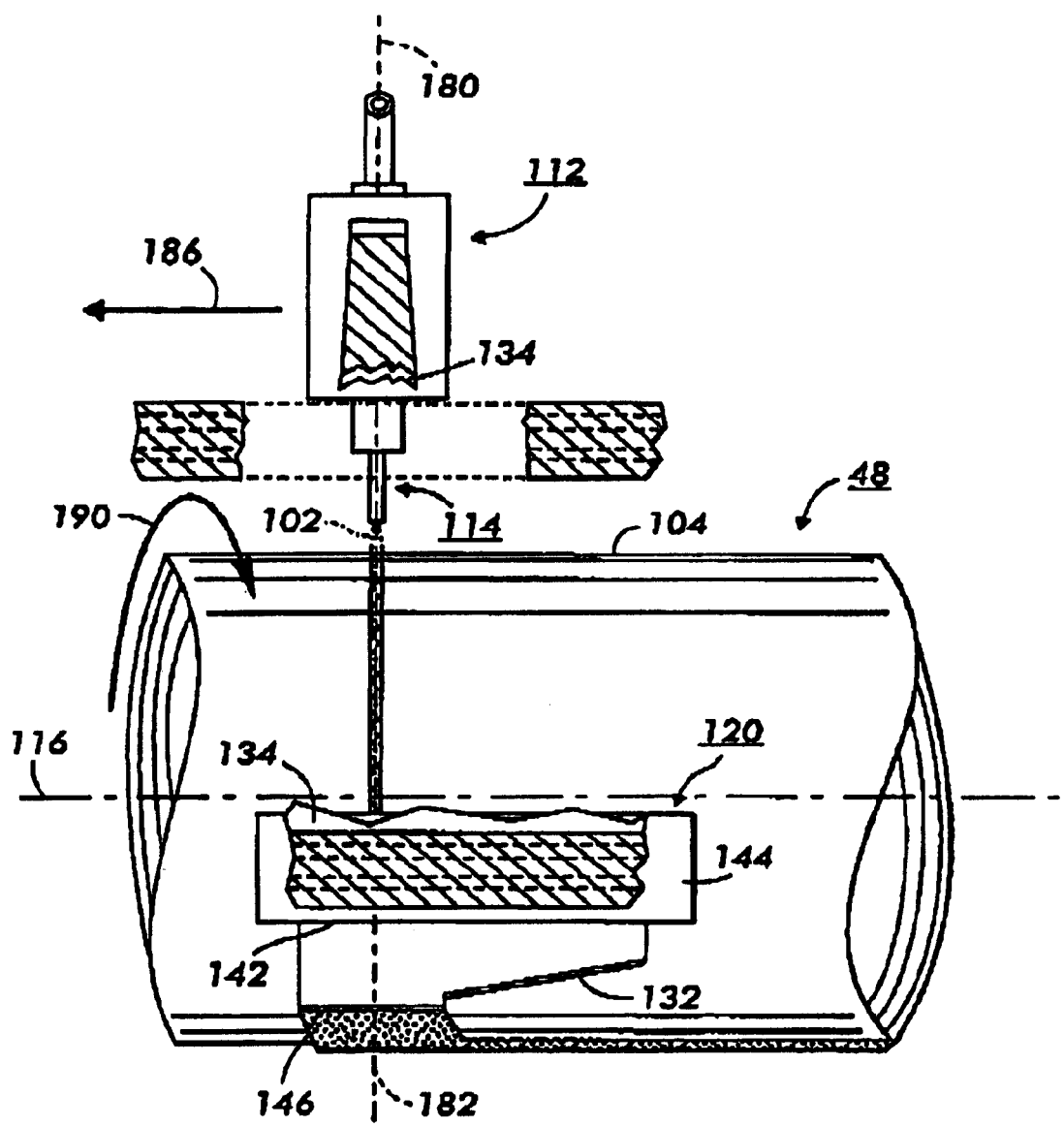
FIG. 3 is a schematic partial plan view along the line 3—3 in the direction of the arrows of the FIG. 1 fuser roll.

FIGS. 1–3 illustrate an apparatus 100 for coating polymeric printing rolls or belts; for example, a xerographic fuser roll 48 is shown. It should be appreciated that the apparatus 100 can be used for flow coating any of a number of polymeric printing rolls or belts, including but not limited to bias charge rolls (BCRs), bias transfer rolls (BTRs), pressure rolls, backup rolls, fuser donor rolls, intermediate transfer rolls and belts, photoconductive belts and rolls, development rolls and belts and development donor rolls, and Hybrid Scavangeless Development rolls and belts.

The apparatus 100 is used to apply coating solution 102 to periphery 104 of the fuser roll 48. The coating solution is pumped via pump 106 through a conduit typically in the form of a pipe 110 to an applicator 112 including nozzle 114 through which the coating solution 102 flows onto periphery 104 of the roll 48.

In embodiments, the coating solution 102 is applied to the periphery 104 in a spiral fashion with the fuser roll 48 rotating about its longitudinal axis 116, while the applicator 112 translates in a direction parallel to the longitudinal axis 116 of the fuser roll 48. The coating solution 102 is thus applied to the periphery 104 of the fuser roll 48 in a spiral fashion. The application of the coating is similar to the path of a cutting tool when turning the periphery of a shaft in a standard lathe. This process can be called flow coating.

Also in embodiments, it is possible to get substantially all the coating solution 102 that passes through the nozzle 114 to adhere to the roll 48 either by accurately controlling the amount of coating solution 102 that is displaced through pump 106 or by controlling accurately in any manner the amount of coating solution 102 that is released at the nozzle 114 of applicator 112. For example, one can employ embodiments to obtain a coating layer of about 0.0020 inches with a tolerance range of about +/−0.0001 inches. Being able to control the thickness of the coating with such precision will substantially reduce the need for grinding and other post coating operations, particularly for use in fusing color images where glossy finish on images is preferred. The surface finish on the periphery of the roll 48 when using the flow coating process may be too smooth for some applications, and subsequent grinding or polishing operations may be required to obtain a dull or flat finish for black and gray tone images where a flat finish image is desired.

Apparatus 100 can have any suitable form and can include any equipment capable of rotating the fuser roll 48 about longitudinal axis 116 while translating the applicator 112 in a direction parallel to the longitudinal axis 116. Standard CNC or engine lathes can be used for this purpose. Specialty equipment can also be designed which will rotate the fuser roll while translating the applicator. Specialized equipment may be advantageous to permit the proper enclosure of the apparatus 100 to contain the volatile coating solution and to maintain the environmental conditions necessary for quality coatings from this process.

In embodiments, the invention can be practiced using an apparatus 100 with an applicator 112, which applies, through the nozzle 114, a spiral coating. The resulting coating is applied in a thread-like fashion and may have peaks and valleys on the periphery 104 of the roll 48. Placing a member in the form of guide 120 against the periphery 104 of the roll 48 as the coating solution 102 is applied to the roll significantly improves the uniformity of the coating upon the roll 48. In embodiments, the longitudinal axis 116 of the roll 48 is positioned horizontally with respect to the floor of the building in which the apparatus is housed. This configuration permits the effect of gravity to properly distribute the coating solution 102 about the periphery 104 of the roll 48.

Similarly, in embodiments the applicator 112 is positioned above the fuser roll 40 so that the stream of coating solution coming from the nozzle 114 can rest upon the periphery 104 of the roll 48. Preferably, tip 115 of nozzle 114 is spaced a distance H above the periphery 104 of the roll 48. If the tip 115 is placed too far from the periphery 104 the coating solution 102 will evaporate before it reaches the periphery. If the tip 115 is placed too closely to the periphery 104, the tip will hit the periphery 104. For embodiments including a roll having a diameter D of approximately four inches, a distance H of approximately ¼ of an inch is adequate. The dynamics of the rotation of the roll and its position on the periphery of the roll assist in the uniform distribution of the solution 102 on the periphery of the roll.

Accordingly, with particular reference to FIG. 1, apparatus 100 includes a coating head assembly 138 in embodiments. Coating head assembly 138 can include a guide 120 to assist in properly distributing the solution 102 along the periphery 104 of the roll 48. The guide 120 is located at the end of coating head assembly 138. The guide includes a member 132 that is preferably in the form of a blade, for example, a steel spring having a thickness T of approximately 0.0015 inches.

The blade 132 is preferably connected with slide 134 of blade 132. Both the applicator 112 and the blade 132 are mounted on the slide 134 and can be positioned in a similar axial position along longitudinal axis 116 of the apparatus 100. In embodiments, the blade 132 has a first surface 140, which is parallel to and slightly spaced from the periphery 104 of the roll 48 with the coating solution 102 separating the periphery 104 from the blade 132.

While the guide 120 can have any configuration in which a first surface 140 of the blade 132 tangentially contacts the periphery 104 of the roll 48 to evenly distribute the coating solution 102, preferably the blade 132 is positioned with a fixed end 142 of the blade mounted to a base 144. The base 144 is mounted to the slide 134. However, the blade 132 can also be directly mounted to the slide 134. The blade 132 also has a free end 146 located spaced from the fixed end 142 of the blade 132.

FIG. 2 illustrates embodiments of the fuser roll 48 and the apparatus 100 in greater detail. The fuser roll 48 can be made of any suitable durable material that has satisfactory heat transfer characteristics. For example, as shown in FIG. 2, the fuser roll 48 includes a substrate in the form of a core 150 having a generally tubular shape and made of a thermally conductive material, for example, aluminum or a polymer. To provide for the driving of the roll, the roll 48 typically includes a first end cap 152 and a second end cap 154 located at a first end 156 and a second end 158 of the core 150, respectively. Coating solution 102 (see FIG. 1) is used to apply coating 160 to the core 150. The coating 160 may be made of any suitable, durable material. For example, the coating 160 may be a fluoroelastomer. In embodiments, the fluoroelastomer includes an additive to increase its thermal conductivity. One such additive to obtain the thermal conductivity is aluminum oxide. While a solitary coat may be applied to the core 150, preferably the coating 160 includes three separate, distinct layers. The first of these layers that is applied to the core 150 is an adhesive layer 161. Applied to the adhesive layer 161 is base coat 162 and applied to the base coat 152 is top coat 163.

The operation of embodiments as shown, for example, by the apparatus shown in FIG. 2 is such that the applicator 112 translates from first position 164 as shown in solid to second position 166 as shown in phantom. The applicator 112 thus travels along with the slide 134 in the direction of arrow 168. The direction of travel of the applicator 112 is parallel to longitudinal axis 116 of fuser roll 48. Concurrently with the translation of the applicator 112, the roll 48 rotates in the direction of arrow 170. The roll 48 is supported in any suitable fashion such as by feed blocks 172 and is rotated in any suitable fashion such as by driver 174 which contacts end cap 154. FIG. 3 shows the relative position of the applicator 112 relative to guide 120. Applicator 112 is positioned centrally about vertical applicator axis 180. The blade 132 of the guide 120 is positioned along the roll 48 in an axial position along the longitudinal axis 116 of the roll 48 such that the fixed end 142 of the blade 132 has a vertical centerline 182 that is in alignment along the longitudinal axis with applicator axis 180. The coating solution 102 coming from nozzle 114 is thus axially positioned in line with centerline 182 of the fixed end 142 of the blade 132. The coating solution 102 coming from the nozzle 114 forms a metered fluid layer, which is spirally positioned, about periphery 104 of the roll 48. The applicator 112, the guide 120, and the base 144, are mounted on slide 134 and move along in a direction parallel with longitudinal axis 116 of the roll in direction of arrow 186 as the roll 48 rotates in the direction of arrow 190.

Figure 4:
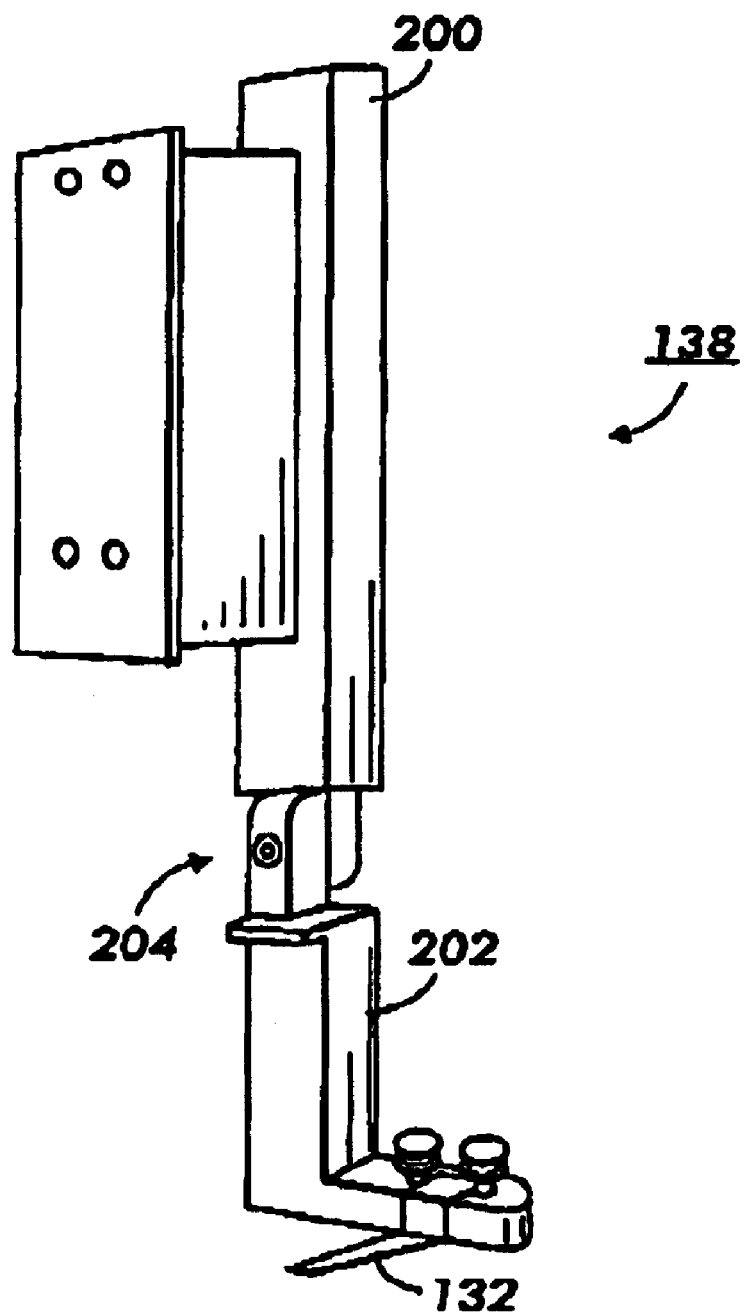
FIG. 4 is a perspective view of an old configuration of a coating head assembly.

FIG. 4 illustrates a more detailed view of the coating head assembly 138. Coating head assembly 138 is composed of an upper portion 200 that is connected to applicator 112 (see FIGS. 1–3) and a lower portion 202 that includes leveling blade 132. They are joined together at junction 204. Some coating head assemblies have been designed to break in the event of a collision with a roll on the coating conveyor. Collisions will occur periodically because rolls will occasionally bunch up on a conveyer, or a roll's orientation will be wrong when it reaches the flow coating apparatus. When this occurs, the coating head assembly breaks. The break occurs along junction 204, as that is generally the weakest point structurally of the coating head assembly. The bottom portion 202 must be rebuilt or reconstructed every time a collision occurs. This requires a fair amount of machining. Rebuilding the current coating head assembly requires approximately 15 hours each time a collision occurs.

Figure 5:
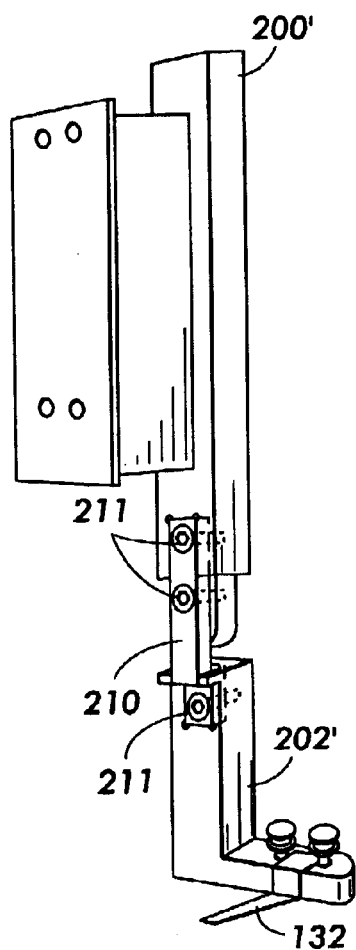
FIG. 5 is a perspective view of an embodiment of a coating head assembly including an embodiment of the present invention.
Figure 6:
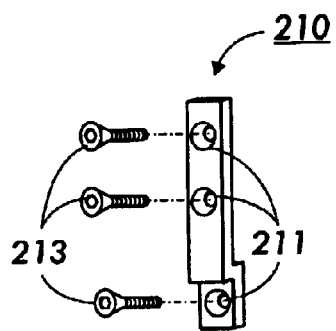
FIG. 6 is an exploded perspective view of an embodiment of a breakaway link.
Figure 7:
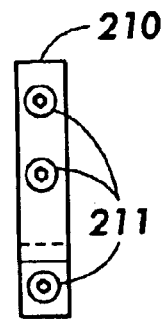
FIG. 7 is a front elevational view of an embodiment of a breakaway link.
Figure 8:
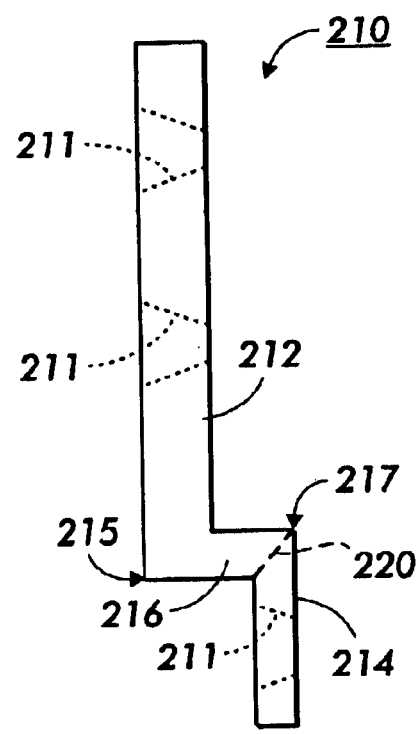
FIG. 8 is an enlarged side elevational view of an embodiment of a breakaway link of the present invention.

FIG. 5 illustrates a coating head assembly comprising embodiments of a breakaway link 210 of the present invention. FIGS. 6–8 show an embodiment of the breakaway link 210 from various perspectives. The link 210 is an essentially one-piece tooled bar assembly. Holes 211 are drilled and tapped into the bar to accommodate fasteners, such as screws 213, that will ultimately secure the link to the two piece coating head assembly.

Embodiments of the breakaway link 210 include a structurally weak point or area that are more likely to break than other portions of the coating head assembly. In embodiments, the breakaway link 210 is stepped along its length to establish a breakpoint. Essentially, the link is divided into three segments or portions. This is most clearly shown by FIG. 8. The first segment 212 and the third segment 214 are roughly parallel. In embodiments, the second segment 216 is substantially perpendicular to the first 212 and third 214 segments. This requires two approximately 90° angles; one angle 215 located between the first 212 and the second 216 segments, and another angle 217 located between the second segment 216 and the third segment 214. The corners (215, 217) increase the structural weakness of the breakaway link.

The third segment 214 is unable to stand as much force as the first segment 212 or the second segment 216, and therefore is more likely to be the site of a break. The segments get thinner from the first to the third segment. The second segment is substantially thinner than the first segment. However, the length of the second segment is substantially in the direction in which force will be applied if a collision occurs between a roll and the coating head assembly. Therefore, while the second segment is thinner, its orientation makes it the least likely to break. The third segment 214 is the thinnest of the three segments. The length of the third segment is also perpendicular to the direction in which force will be applied if a collision occurs between a roll and the coating head assembly. As force is exerted on the coating head assembly, it is most likely to break at some point along segment 214, but most especially at corner 217. Corner 217 is structurally weakest part of the link 210.

When the coating head assembly collides with an object that is undergoing the flow coating process, the link will most likely snap along breakline 220 at corner 217. In embodiments, the lower portion 202' of coating head assembly 138 is most likely to contact the roll 48. When it contacts the roll, force is imparted to the lower portion 202', which conveys this force to the third segment 214 of the breakaway link 210. The force applied to the third segment 214 creates a torque about the corner 217. Breaks in the breakaway link usually occur along breakline 220.

When the assembly snaps due to a collision, a user removes the screws or other fasteners that hold the pieces of the snapped link 210 to the upper portion 200' and the lower portion 202' of the coating head assembly 138 and replaces the snapped link with a new one. Within minutes the coating head assembly 138 can be reattached for usage.

In embodiments, the link 210 is composed of a material that is more brittle/less ductile than the material making up the rest of the coating head assembly 138. In embodiments, the coating head assembly can be made from standard aluminum bar stock, while the breakaway link 210 is made from aluminum jig-plate. Another usable material for the breakaway link is Al 6061-T6. Both of these types of aluminum are more brittle than standard aluminum. Making the link out of a more brittle material than the rest of the cleaning head assembly 138 increases the chance that the link portion of the coating head assembly 138 will break rather than another portion thereof. The types of aluminum listed above have no special properties. If the coating head assembly were made of steel, then the breakaway link can be made from any of a number of materials that are less ductile and more brittle than steel.

Both providing the link 210 with a structurally weak configuration and making the link out of material more brittle than the remainder of the coating head assembly increase the chance that the link will break rather than the another portion of the coating head assembly. The combination of the two features greatly increases the chance that this will happen.

While this invention has been described in conjunction with various embodiments, it is believed that many alternatives, modifications, and variations will be apparent to those skilled in the art. Accordingly, it is intended to embrace all such alternatives, modifications, and variations as are incorporated within the spirit and broad scope of the appended claims.

What is claimed is:

1. A breakaway coating head assembly comprising:
   a coating head applicator;
   a first coating head portion having first and second end segments, the first end segment of the first coating head portion being connected to said applicator;
   a breakaway link having first and second end segments, the first end segment of the link being connected to the second end segment of the first coating head portion, the breakaway link having a weaker portion that is weaker than a remainder of the breakaway link, the weaker portion being defined by at least one sharp bend in the material;
   a second coating head portion having first and second end segments, the first end segment of the second coating head portion being connected to the second end segment of the breakaway link and the second end segment of the second coating head portion having a blade extending therefrom;
   wherein the first coating head portion, the second coating head portion, and the breakaway link form a rigid arm.

2. The assembly of claim 1 where the assembly is a coating head assembly.

3. The assembly of claim 1 wherein the breakaway link is made of a material that is more brittle than the material making up the first portion and the second portion.

4. The assembly of claim 1 wherein the breakaway link has a weaker portion that is weaker than a remainder of the breakaway link, the weaker portion being defined by at least one sharp bend in the material.

5. The assembly of claim 1 wherein the breakaway link is made of a material that is more brittle than the material making up the first portion and the second portion.

6. A breakaway coating head assembly comprising:
- a breakaway link with first and second end segments, where the second end segment includes a portion that is weaker than the remainder of the breakaway link;
- a first coating head portion connected to the first end segment of the breakaway link;
- a second coating head portion connected to the second end segment of the breakaway link; wherein the first coating head portion, the second coating head portion, and the breakaway link form a rigid arm;
- a coating head applicator connected to the first coating head portion;
- a blade extending from the second coating head portion; and
- wherein the weaker portion of the second end segment of the breakaway link is weak enough so that, in the event of a collision with an object being coated, the weaker portion breaks, thereby preventing breakage of other components of the coating head assembly.

7. The assembly of claim 6 wherein the weaker portion of the breakaway link is defined by at least one sharp bend in the material.

8. The assembly of claim 6 wherein the breakaway link is made of a material that is more brittle than the material making up the first portion and the second portion.

9. The assembly of claim 6 wherein the weaker portion of the link is thinner than the first end segment.

* * * * *

UNITED STATES PATENT AND TRADEMARK OFFICE
CERTIFICATE OF CORRECTION

PATENT NO. : 6,827,517 B2
DATED : December 7, 2004
INVENTOR(S) : Thomson et al.

It is certified that error appears in the above-identified patent and that said Letters Patent is hereby corrected as shown below:

<u>Column 8,</u>
Lines 56-65, please delete
Claim 2 (CANCELED)

Claim 3 (CANCELED)

Claim 4 (CANCELED)

Replace canceled claims 2, 3, and 4, with allowed claims 6 (now 2), 7 (now 3), and 8 (now 4), as follows:

2. The assembly of claim 1 where the second end segment of the link includes the weaker portion of the breakaway link.

3. The assembly of claim 1 wherein the second end segment of the link is thinner than the first end segment.

4. The assembly of claim 1 wherein the second end segment of the breakaway link is connected to the first end segment of the second portion by screws.

Signed and Sealed this

Ninth Day of August, 2005

JON W. DUDAS
*Director of the United States Patent and Trademark Office*